(12) United States Patent
Karadakal

(10) Patent No.: US 9,454,361 B2
(45) Date of Patent: Sep. 27, 2016

(54) SYSTEM AND METHOD OF MERGING OF OBJECTS FROM DIFFERENT REPLICAS

(75) Inventor: Basavaraj V. Karadakal, Santa Clara, CA (US)

(73) Assignee: Avaya Inc., Basking Ridge, NJ (US)

( * ) Notice: Subject to any disclaimer, the term of this patent is extended or adjusted under 35 U.S.C. 154(b) by 2081 days.

(21) Appl. No.: 12/503,562

(22) Filed: Jul. 15, 2009

(65) Prior Publication Data

US 2011/0016450 A1 Jan. 20, 2011

(51) Int. Cl.
*G06F 9/44* (2006.01)
(52) U.S. Cl.
CPC .......................................... *G06F 8/71* (2013.01)
(58) Field of Classification Search
None
See application file for complete search history.

(56) References Cited

U.S. PATENT DOCUMENTS

| | | | |
|---|---|---|---|
| 6,615,223 B1 | 9/2003 | Shih et al. | |
| 7,603,393 B1 * | 10/2009 | Cote et al. | 707/101 |
| 8,359,571 B2 * | 1/2013 | Clemm et al. | 717/120 |
| 2004/0117667 A1 | 6/2004 | Lavender et al. | |
| 2006/0101443 A1 * | 5/2006 | Nasr | 717/163 |

OTHER PUBLICATIONS

Larry Allen et al., *ClearCase MultiSite: Supporting Geographically-Distributed Software Development*, Software Configuration Management, 194 (1995).*
"Rational ClearCase Commands Reference," http://www.ipnom.com/ClearCase-Commands/mkelem.html, May 14, 2009, 9 pages.
CM-Logic Ltd., CM-Logic announcement, http://www.cm-logic.com/news/cm-logic-announces-cm-inpractice-4.0-for-ibm-clearcase . . . , May 14, 2009, 2 pages.

* cited by examiner

*Primary Examiner* — Henry Tsai
*Assistant Examiner* — Juanito Borromeo

(57) ABSTRACT

A first object, typically a software source code object, is checked-in at a first replica of a base object. The replica typically comprises a plurality of objects (e.g., a source code base for a software project). The first object is a version of a base object. The first object is then delivered to a second replica of the base object. If it is determined at the second replica that a trivial merge cannot be performed between the first object and the current base object, the current base object is delivered to the first replica. The first object is rebased with the current base object. The rebased first object is sent to the second replica and a trivial merge is performed between the rebased first object and the current base object.

21 Claims, 3 Drawing Sheets

SYSTEM AND METHOD OF MERGING OF OBJECTS FROM DIFFERENT REPLICAS

TECHNICAL FIELD

The system and method relates to object management systems and in particular to object management systems that merge objects from different replicas.

BACKGROUND

There are a number of systems for managing objects such as source code files. These systems allow a developer to check-out a file(s) of a software base, make modifications to the file(s), and then check the files back in to the software base. The checked-in software must then be merged into the software base and/or other branches of the software base. The process of checking-in a file and merging the file is relatively straightforward when all the development is occurring at the same location and there are a limited number of developers. Files can be checked-in and merged at the same location using the same process.

However, current systems fall short when development on a software base is accomplished by multiple developers at multiple locations each of which has its own replica of the base. A developer may have to check-in a file at one location and then login remotely to a second location to complete the merge process. Having to complete these steps separately causes more complexity for cross-site software development.

For example, the IBM® ClearCase® system requires that a developer at a first location check-in a changed file at the first location. After the file has synchronized to a second replica, the developer must login at the second location and then perform a merge of the file into the code base. The developer is unable to perform these two steps at the same location, thus causing the developer to have extra overhead when checking-in and merging code in a multi-location environment.

SUMMARY

The system and method are directed to solving these and other problems and disadvantages of the prior art. A first object, typically a software source code object, is checked-in at a first replica of a base object. The replica typically comprises a plurality of objects (e.g. a source code base for a software project). The first object is a version of a base object. The first object is then delivered to a second replica of the base object, to be merged at the second replica. If it is determined at the second replica that a trivial merge cannot be performed between the first object and the current base object, the current base object is synchronized back to the first replica. The first object is rebased with the current base object. The rebased first object is then delivered to the second replica and a trivial merge is performed between the rebased first object and the current base object.

DEFINITIONS

Below is a list of definitions used to clarify the terminology used herein.

Base Object—A base object is an object from which another object is created.

Trivial Merge—Merging two objects where one of the two objects is the base object from which the other object was originally generated. A trivial merge results in a new version of base object which is identical to the other object.

Non-Trivial Merge—Merging two objects where both of the two objects are derived from the same base object, but are different than the base object. There are two kinds of non-trivial merges: 1) Automatic, and 2) Complex. Automatic is where the two merged objects are different, but the changes to each object have occurred in different sections (functions). Complex is where the two merged objects are different and changes have been made to the same section (functions) of both objects. Complex merges will typically have to be reconciled by a developer.

Rebasing—Updating an object with the current base version by merging the changes (either automatic or complex) from the current base object into the object.

BRIEF DESCRIPTION OF THE DRAWINGS

These and other features and advantages of the system and method will become more apparent from considering the following description of an illustrative embodiment of the system and method together with the drawings, in which.

DETAILED DESCRIPTION

Figure 1:
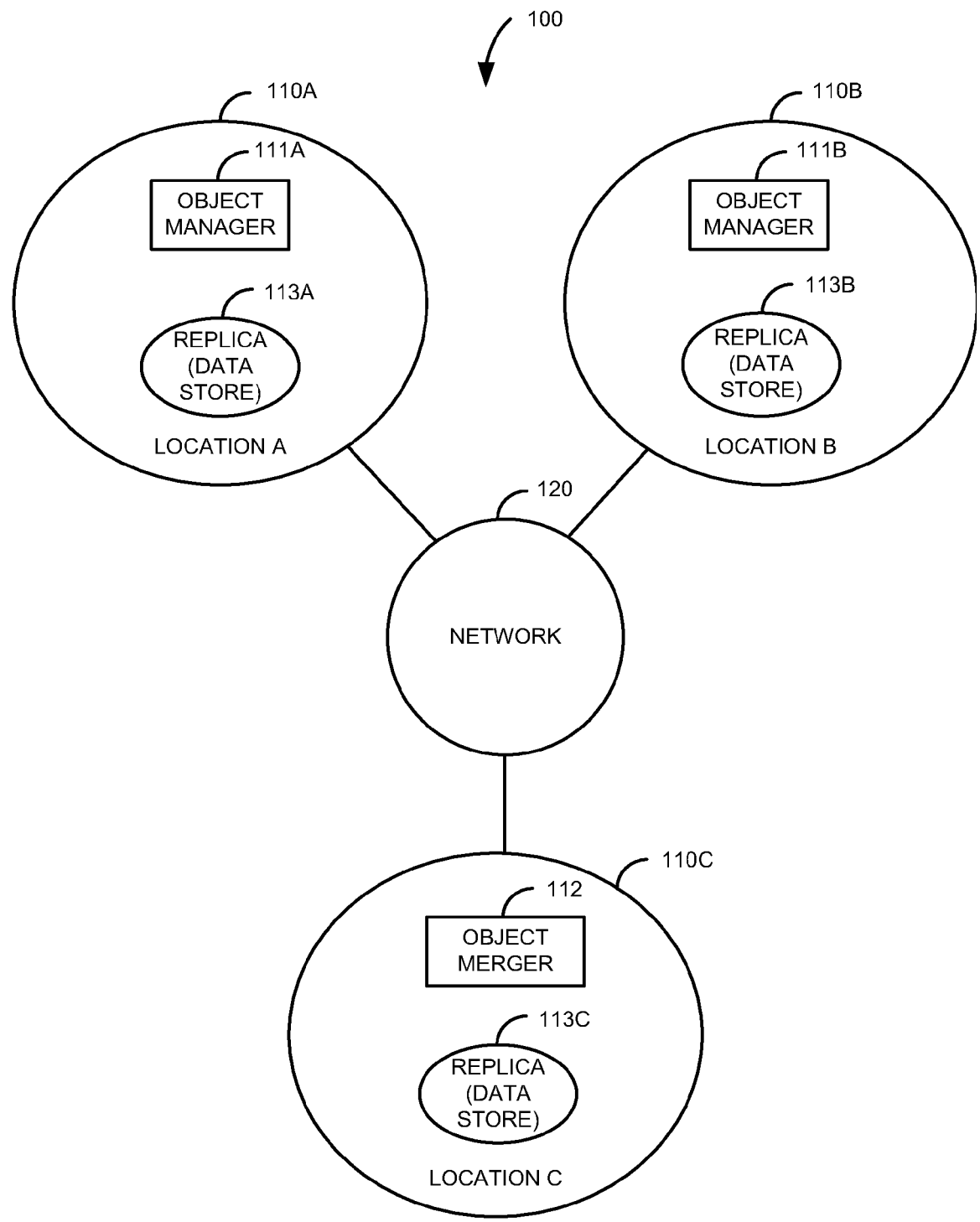
FIG. 1 is a block diagram of a first illustrative system for managing merges of objects from different replicas.

FIG. 1 is a block diagram of a first illustrative system 100 for managing merges of objects from different replicas. The first illustrative system 100 comprises locations 110A, 110B, 110C, and the network 120. The network 120 can be any type of network such as the Internet, a Local Area Network (LAN), a Wide Area Network (WAN), the Public Switched Telephone Network (PSTN), a wireless network, a wired network, and the like. Each location 110 comprises a replica 113—a copy—of an object. The replicas 113 are a distributed data-store for storing and synchronizing information between locations 110 such as a database, a directory service, and the like. A replica typically contains multiple objects of an object (code) base. When objects (data) in a replica 113 changes, the changes in that replica 113 are synchronized (made) to the other replicas 113 using known techniques.

Locations 110A and 110B each comprise an object manager 111. The object manager 111 is any device/software capable of managing objects. An object can be any type of object such as a software object (e.g., a Java object, a C object, a C++ object, a shell script, and the like), a binary software object, an image object, a video object, a file object, and the like. Location 110C is not shown with an object manager 111, but can also contain an object manager 111.

Location 110C further comprises an object merger 112. An object merger 112 is any device/software capable of merging objects and/or facilitating the merging of objects. The object merger 112 is shown only in location 110C, but any locations 110A and 110B can also contain an object merger 112.

Figure 2:
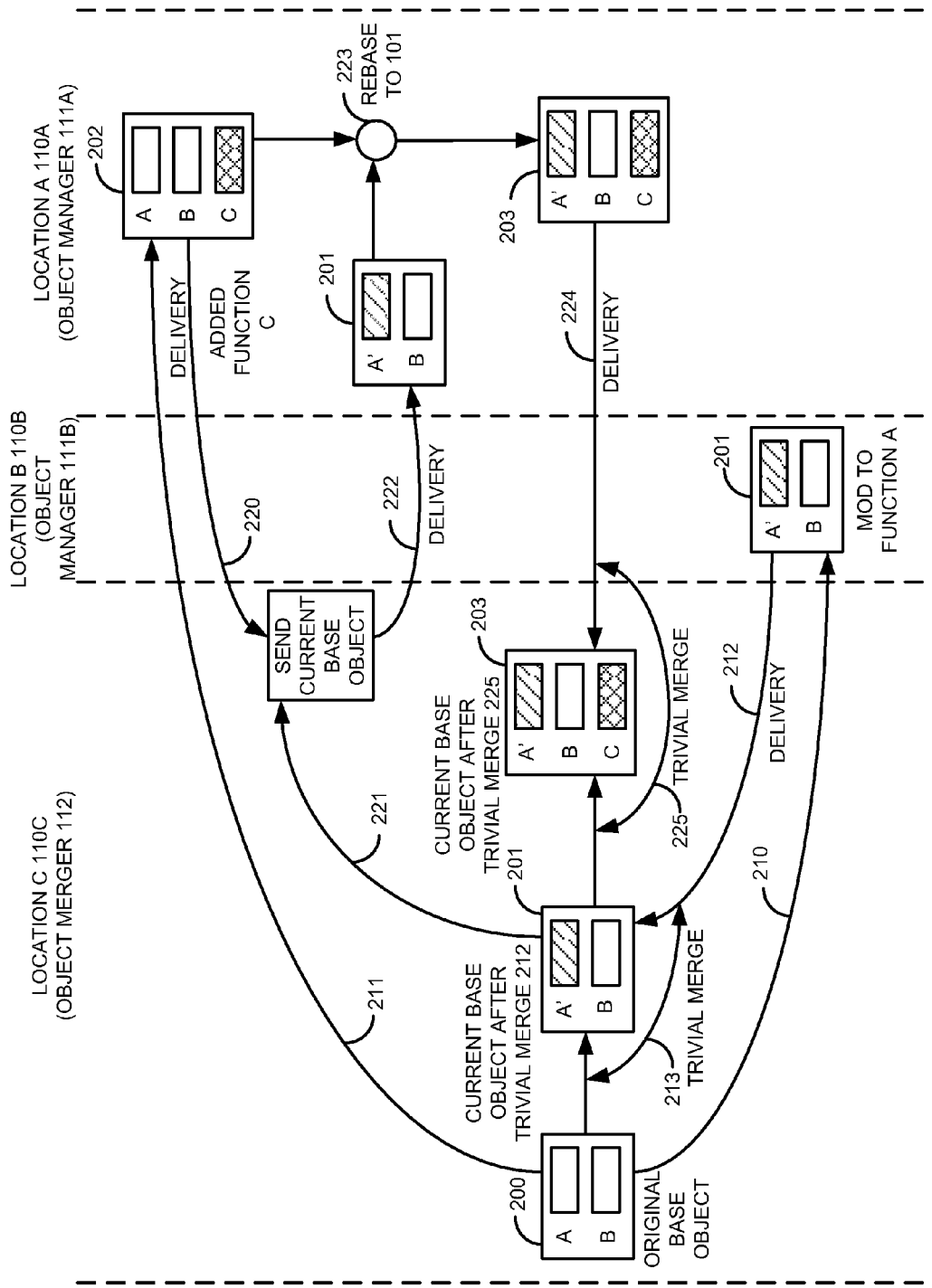
FIG. 2 is a block diagram indicating how objects are merged from different replicas.

FIG. 2 is a block diagram indicating how objects are merged from different locations 110 based on the exemplary block diagram of FIG. 1. FIG. 2 shows an example of a software object (e.g. a Java source file) that is modified and merged. An original base object 200 is stored in the replicas 113 (after synchronization). The original base object 200 has two functions (sections), A and B. A software developer at location 110B requests to check-out a copy of the original base object 200 to work on. The object manager 110B checks-out 210 a copy of the original base object 200 to the developer at location 110B to work on. A software developer at location 110A also requests to check-out a copy of the original base object 200. The object manager 110A checks-out 211 a copy of the original base object 200 for the developer at location 110A to work on. In the drawing it is shown that the developer at location 110A and the developer at location 110B are checking-out a copy of the original base object 200 from replica 113C for ease of illustration. However, the developer at location 110A will check-out the copy of the original base object 200 from replica 113A and the developer at location 110B will check-out a copy of the original base object 200 from replica 113B.

The developer at location 110B modifies function A (identified as A') of the checked-out version of the original base object 200 to produce a first object 201 with the same name. The developer at location 110B requests to check-in the first object 201. The object manager checks-in the first object into replica 113B. The first object 201 is delivered (synchronized) 212 to replica 113C from replica 113B. Synchronizing the replicas 113 can be accomplished in a variety of ways, such as automatically upon requesting to merge (deliver) the first object, based on a time interval, and the like. A trivial merge 213 is performed by the object merger 112 between the original base object 200 and the first object 201 at replica 113C. A trivial merge 213 can be performed because one of the objects being merged is the original base object 200 and the first object 201 was generated from the original base object 200. The first object 201 now becomes the current base object in replica 113C and is synchronized to replicas 113A and 113B (not shown).

The software developer at location 110A modifies the original base object 200 by adding function C to generate a second object 202 with the same name. The modification can be a newer version of the base object 200, based on an older version of the base object 200 (e.g. the developer cut and pasted an older version of the base object into the file), a copy of a deleted base object, and the like. The software developer at location 110A requests to check-in the second object 202. The object manager 111A checks-in the second object 202 into replica 113A. Object manager 111A delivers 220 the second object 202 to replica 113C (and replica 113B, not shown) from replica 113A.

The object merger 112 determines if a trivial merge can be performed between the first object 201 and the second object 202. In this example, a trivial merge cannot be performed. This is because the current base object (first object) 201 has been modified and is different than the original base object 200 that the second object 202 is generated from. The object merger 112 can force immediate synchronization of the new base object 201 to the location 110A, to enable the object manager 111A at location 110A to rebase second object 202 with the new base object 201 at location 110A. Object manager 111A rebases 223 the current base object 201 into the second object 202 by merging the changes (A') in the current base object 201 into second object 202 to produce a third object 203 in replica 113A. Rebasing the current base object 201 can be done automatically (e.g., if the merge is a non-trivial automatic merge), manually by the developer reconciling the differences of a complex merge, based on user-defined preferences, and the like. The object manager 111A delivers (synchronizes) 224 the third object 203 to the object merger 112 via replica 113C. Upon delivery 224, the object merger 112 performs a trivial merge 225 of the third object 203 with the current base object 201. The trivial merge 225 can be performed because the current base object 201 has been rebased by object manager 111A into the third object 203, which is based on the current base object 201. The trivial merge 225 causes the third object 203 to become the current base object.

Figure 3:
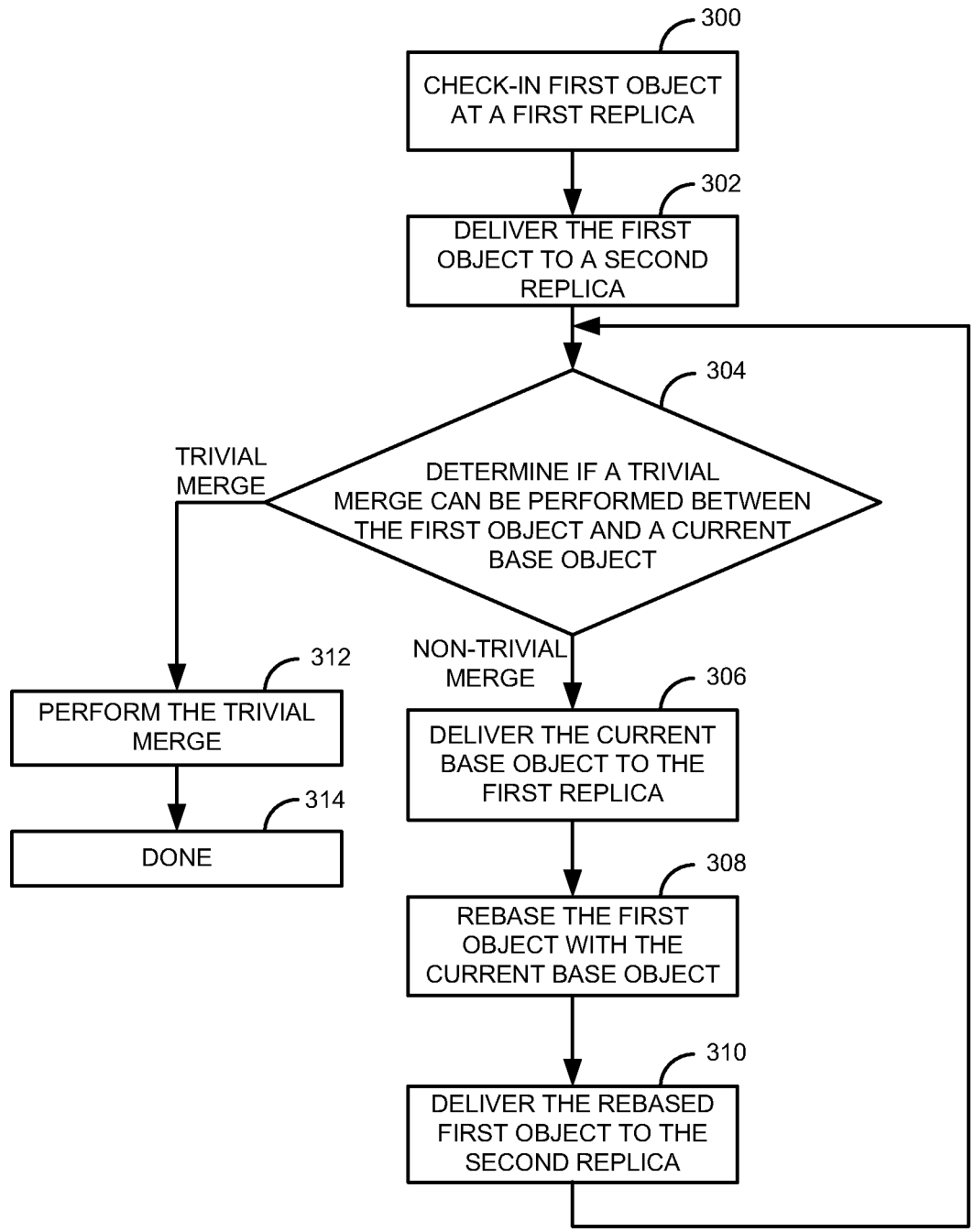
FIG. 3 is a flow diagram of a method for managing merges of objects from different replicas.

FIG. 3 is a flow diagram of a method for managing merges of objects from different replicas. Illustratively, the object manager 111 and the object merger 112 are stored-program-controlled entities, such as a computer/processor, which performs the method of FIG. 3 by executing a program stored in a storage medium, such as a memory or disk.

The process begins when a first object is checked-in 300 at a first replica 113. The first object is a version of a base object. The first object is delivered 302 to a second replica 113. The process determines 304 at the second replica if a trivial merge can be performed between the first object and the current base object. If the trivial merge in step 304 can be performed, the process performs 312 the trivial merge and is done 314.

Otherwise, if the trivial merge cannot be performed in step 304 because the merge is a non-trivial merge (complex or automatic), the current base object is delivered (synchronized) 306 to the first replica. The first object is rebased 308 with the current base object. The rebased first object is delivered 310 to the second replica. The process then determines 304 if a trivial merge can be performed between the rebased first object and the current base object. In this example, the trivial merge in step 312 will be performed because the first object has been rebased to the current base object.

The previously described systems and methods can also be used where there are multiple code branches. For example, during a software development after a code version is released (version 1.0), one code branch may be created to only integrate bug fixes (version 1.01) while another branch may be created to add feature enhancements (version 2.0). Both versions 1.01 and 2.0 are created from the same code base and there is one master replica of each code base that is delivered to the other replicas 113. In the future, a file from version 1.01 and version 2.0 may need to be merged to integrate the bug fixes from version 1.01 into version 2.0. This can be done using the same process that is described in FIGS. 1-3. In order to merge the two files, a trivial merge cannot be performed and the files will have to be rebased in order to perform a trivial merge as described previously.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The terms "a" or "an" entity refer to one or more of that entity. As such, the terms "a" (or "an"), "one or more" and "at least one" can be used interchangeably herein. It is also to be noted that the terms "comprising", "including", and "having" can be used interchangeably.

Of course, various changes and modifications to the illustrative embodiment described above will be apparent to those skilled in the art. These changes and modifications can be made without departing from the spirit and the scope of the system and method and without diminishing its attendant advantages. The above description and associated Figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for managing changes in objects at different locations comprising:
    a. checking-in a first object at a first replica of a base object, wherein the first object is a version of the base object;
    b. delivering the first object to a second replica of the base object;
    c. determining at the second replica if a trivial merge can be performed between the first object and a current said base object;
    d. in response to determining that the trivial merge cannot be performed, delivering the current base object to the first replica; and
    e. rebasing the first object with the delivered current base object.

2. The method of claim 1, further comprising the steps of delivering the rebased first object to the second replica and performing the trivial merge of the rebased first object and the current base object to form a new said current base object.

3. The method of claim 1, wherein the step of delivering the first object to the second replica is accomplished automatically upon requesting to merge the first object.

4. The method of claim 1, wherein the step of delivering the first object to the second replica further comprises synchronizing changes in the first replica to the second replica.

5. The method of claim 1, wherein the first object is an item selected from the group comprising: a newer version of the base object and a copy of the base object.

6. The method of claim 1, wherein rebasing is accomplished based on a user defined preference and/or manually.

7. The method of claim 1, wherein the base object, the current base object, and the first object all have a same name.

8. The method of claim 1, in response to determining that the trivial merge can be performed, performing the trivial merge of the first object and the current base object to form a new said current base object.

9. The method of claim 1, wherein the first object is a Java object, a C object, a C++ object, a binary software object, a shell script object, an image object, a video object, a directory object, and a file object.

10. The method of claim 1, wherein the first object is in a first code branch and the current base object is in a second code branch.

11. A system for managing changes in objects at different locations comprising:
    a. a object manager configured to check-in a first object at a first replica of a base object, wherein the first object is a version of the base object, deliver the first object to a second replica of the base object, and rebase the first object with a current said base object; and
    b. an object merger configured to determine at the second replica if a trivial merge can be performed between the first object and the current base object, and responsive to determining that the trivial merge cannot be performed, deliver the current base object to the first replica.

12. The system of claim 11, wherein the object manager is further configured to deliver the rebased first object to the second replica and automatically perform the trivial merge of the rebased first object and the current base object to form a new said current base object.

13. The system of claim 11, wherein the object manager is further configured to deliver the first object to the second replica automatically upon a request to merge the first object with the current base object.

14. The system of claim 11, wherein the object manager and the object merger are further configured to synchronize changes in the first replica to the second replica.

15. The system of claim 11, wherein the first object is an item selected from the group comprising: a newer version of the base object and a copy of the base object.

16. The system of claim 11, wherein rebasing in accomplished based on a user defined preference and/or manually.

17. The system of claim 11, wherein the base object, the current base object, and the first object all have a same name.

18. The system of claim 11, responsive to determining that the trivial merge can be performed, for performing the trivial merge of the first object and the current base object to form a new said current base object.

19. The system of claim 11, wherein the first object is a Java object, a C object, a C++ object, a binary software object, a shell script object, an image object, a video object, a directory object, and a file object.

20. The method of claim 11, wherein the first object is in a first code branch and the current base object is in a second code branch.

21. An apparatus for managing changes in objects at different locations comprising:
    a. means for checking-in a first object at a first replica of a base object, wherein the first object is a version of the base object;
    b. means for delivering the first object to a second replica of the base object;
    c. means for determining at the second replica if a trivial merge can be performed between the first object and a current said base object;
    d. means responsive to the determining means, determining that the trivial merge cannot be performed, means for delivering the current base object to the first replica; and
    e. means for rebasing the first object with the delivered current base object.

* * * * *